United States Patent [19]
Wagner

[11] Patent Number: 4,488,773
[45] Date of Patent: Dec. 18, 1984

[54] OPTICAL FIBER POSITION SENSOR

[75] Inventor: Robert A. Wagner, Manchester, Conn.

[73] Assignee: United Technologies Corporation, Hartford, Conn.

[21] Appl. No.: 452,674

[22] Filed: Dec. 23, 1982

[51] Int. Cl.³ ............................................... G02B 7/26
[52] U.S. Cl. ............................. 350/96.20; 350/96.25; 350/96.29; 427/163
[58] Field of Search ............... 350/96.20, 96.21, 96.22, 350/96.25, 96.27, 96.29, 96.30, 96.33; 427/163, 164, 165, 166, 167

[56] References Cited

U.S. PATENT DOCUMENTS

| | | | |
|---|---|---|---|
| 3,871,935 | 3/1975 | Gloge et al. | 350/96.21 X |
| 4,119,363 | 10/1978 | Camlibel et al. | 350/96.20 |
| 4,252,457 | 2/1981 | Benson et al. | 403/284 |
| 4,295,707 | 10/1981 | Nakai et al. | 350/96.20 |
| 4,350,744 | 9/1982 | Snitzer et al. | 428/630 |
| 4,358,512 | 11/1982 | Richter | 428/630 |
| 4,389,086 | 6/1983 | Furusawa et al. | 350/96.20 |

FOREIGN PATENT DOCUMENTS

| | | | |
|---|---|---|---|
| 2721347 | 11/1978 | Fed. Rep. of Germany | 350/96.21 |
| 54-004149 | 1/1979 | Japan | 350/96.20 |
| 56-147105 | 11/1981 | Japan | 350/96.20 |
| 57-148715 | 9/1982 | Japan | 350/96.20 |

OTHER PUBLICATIONS

Esposito, John J., "Epoxyless Fiber Optic Connector Concepts for Single-Fiber Cables", Electronic Packaging and Production, Jan. 1979, pp. 216-220.
Electronics, "International Newsletter", Jul. 17, 1980, p. 67.

Primary Examiner—John Lee
Attorney, Agent, or Firm—C. G. Nessler

[57] ABSTRACT

An array of optical fibers is precisely positioned in channels in a head when liquid metal, such as tin-lead solder, is used. This is compared to irregular locating which is obtained with organic resins. A glass fiber is first ion plated with about $1 \times 10^{-6}$ m of a metal such as nickel which is wetted by the solder. The fiber is placed loosely in a channel in a metal holder and solder is infiltrated. In an embodiment, strain on the glass fiber where it exits its holder channel is alleviated when the polymer jacket is also ion plated with metal and soldered to the holder.

5 Claims, 10 Drawing Figures

OPTICAL FIBER POSITION SENSOR

DESCRIPTION

TECHNICAL FIELD

The present invention is related to the construction and method of making connectors for optical fibers.

BACKGROUND ART

In optical communications and measurement systems, optical signals are often transmitted across in a gap formed at two glass fiber ends. It is well known that signal losses can occur due to offset, angular misalignment, and surface defects at the terminal ends of the fibers. A conventional way of making connectors and other like fittings for holding fibers is to retain them with an epoxy resin. For example, to make a fitting which would hold the terminal ends of a multiplicity of fibers a plate would be cut with grooves suitable to receive the fibers, the fibers would be laid in the grooves, a cover plate would be added, and epoxy resin would be infiltrated to surround and fixedly retain the fibers in their grooves.

Similar techniques have been used to manufacture a specialized optical fiber device in which fiber array spacing and fiber end quality are especially critical. This is an optical position sensor which is comprised of a multi-channel binary encoded modulator plate placed between the transmit and receive ends of a fiber optic array. The components of the sensor comprise the fiber optic array transmitter, a light source coupled to the transmitter; a receiver precisely matching the transmitter fiber array with an equivalent number of channels, with each channel coupled to a photodetector; and a movable modulator plate which is connected to the article for which movement sensing is desired. The modulator plate is perforated and intercepts the light propagating through the transmit/receive gap. To make such a device, it is important that the opposing transmit and receive ends be identically aligned for optimal light transmission; it is also important that the spatial relationship between the multiplicity of fiber ends correlate exactly with the hole spacings in the modulator plate.

In miniature sized sensors which will produce a resolved linear motion of 0.127 mm, a 0.025 mm separation between channels must be implemented. In doing this, it is necessary to precisely align and space the fibers to form mirror image multi-channel fiber arrays (e.g. nine channels) on the transmit and receive sides. In utilizing a typical approach described above, a metal connector was made and cut in two, transverse to the axes of the fibers. The opposing cut surfaces were polished to make the transmit and receive sides. However, it was observed that there was variation in spacing between the individual fibers, due to slight lateral movement of some of the fibers within their U-shaped grooves. The amount of epoxy on one side of the groove was bigger than on the other side even though a minimal practical fit was obtained. Therefore, the fiber spacing did not exactly correspond with that of the modulator plate holes. Furthermore, there were voids at certain locations in the epoxy resin where the cut ends were exposed. This, combined with what appeared to be the inherent properties of the epoxy resin, resulted in glass fiber ends which tended to have either scratches (presumably due to accumulation of polishing grit and passage of an agglomerate across the surface of the fiber) and slight edge chips (presumably due to either voids or strength limitations for the epoxy under the action of the polishing.) Despite careful procedures, it was found very difficult to make a connector which had excellent light transmittance and excellent dimensional precision.

Also, certain optical fiber devices are intended for use in environments which may have either high temperature or high moisture content. For both these circumstances, epoxy resins present limitations. They tend to absorb moisture which can lead to fiber degradation at the interface between the fiber and the epoxy. They also are temperature limited and the epoxy resin will start oxidizing at elevated temperatures. In these instances and others, better hermetic seals are desired than epoxy resins allow.

Of course, there is considerable prior art relating to the making of terminal fittings for optical fibers. While the device described above is somewhat distinct, connectors for making splices have received considerable development. See particularly the article "Preparation of Optical Fiber Ends for Low Loss Tape Splices" by Chinnock, Volume 54, No. 3 (March 1975), pp. 471–477 and the article "A Vacuum-Assisted Plastic Repair Splice for Joining Optical Fiber Ribbons" by Cherin et al, Volume 58, No. 8, (October 1979), pp. 1825–1838, both in The Bell System Technical Journal, American Telephone and Telegraph Company, New York.

Connectors which do not use epoxy have been investigated. For instance, the article "Epoxyless Fiber Optic Connector Concepts for Single-Fiber Cables" by Esposito in Electronic Packaging and Production (January 1979), pp. 216–220, describes connectors which employ deformable plastic plugs. Also discussed therein is the use of solders including 60/40 tin-lead solder and 50/50 indium-tin solder. But while there was initial success, there was a lack of reproducibility and it was concluded that solder use was not promising. It was surmised that the effect was simply mechanical, in that upon solidification the solder shrunk and physically secured the fiber. In U.S. Pat. No. 4,119,363 to Camlibel et al a single optical fiber sealed in a housing by means of solder is also described. There it is said specifically that the solder upon solidifying and cooling squeezes against the fiber to form a hermetic seal. In the Camlibel et al fitting, the fiber is precisely aligned by the mechanical configuration of the housing. Related U.S. Pat. No. 4,252,457 to Benson et al mentions again the problems involved in getting actual bonds between metal and glass and discloses a method which involves swaging of a soft metal connector around the glass fiber. Thus, it can be seen that while metal solder joints are attractive in substitution of epoxy joints, they have been used in a limited manner and without great success.

Another limitation of connectors is that they cannot be constructed with disregard to the flexing which takes place at the point at which the fiber exited the connector at the side opposite the polished face. While a fiber is covered by a typical polymer coating up to a point at which it enters the connector, it was prone to breakage at that point due to flexing stress. While supplementary mechanical devices which grasp the jacket may be utilized, a simplified procedure was sought, preferably using the resin which bonded the fiber into the connective body. However, the epoxy resins that were regularly used did not tend to bond well to the polymer jacket.

Accordingly, there has been a need for improvement in making fiber optic array connectors in general and in the use of metallic solders in particular.

DISCLOSURE OF THE INVENTION

An object of the invention is to construct connectors for multi-channel fiber optic arrays which have high precision of fiber location, and in which the fiber ends are accurately polished for good transmittance. A further object is to provide an easy means for alleviating the strain which results on an array of glass fibers where they exit a metal holder in which they are bonded.

According to the invention a liquid metal is solidified in a channel of a holder to capture the glass optical fiber. The channel is made so the fiber fits loosely in the channel prior to the infiltration of solder. The fiber is first vapor deposited with a metal which the solder will wet. Suprisingly, the physical properties of the liquid metal are sufficiently different from the previously used epoxies to centralize the fiber in the channel. Thus, the fibers are closely centered in the channels, compared to the centering which results from the use of epoxy.

In the preferred embodiment of the invention, two identical heads can be made. A holder is formed of two parts; a first part which has grooves into which the metal coated fibers are placed, and a second cover part which is laid on the first part to close over the grooves. The assembly is heated, solder is infiltrated, whereupon cooling creates the bond. Next, the assembly is cut in two transverse to the fiber lengths and the opposing cut faces are polished to make two heads with identical mating arrays of fibers. These mating heads are readily used in a position sensor.

In another embodiment of the invention, the optical fiber is stripped of its jacket for a first length. Then the vapor deposited coating is laid on a second length which includes the first length and a portion of the jacket adjacent to the first length. Then, in the bonding step, the solder is used to join both the glass core and the jacket to the holder. This lessens flexure strain on the central glass fiber where it is bonded to the holder.

In addition to the precise positioning, it is found that the surface finishes of the polished ends of the fibers are much more free of small chips around their circumferences than results from using epoxy. The use of solder surrounding the fiber also provides a strong hermetic seal, resisting the infiltration of moisture and the like around the fiber.

The foregoing and other objects, features and advantages of the present invention will become more apparent from the following description of preferred embodiments and accompanying drawings.

BEST MODE FOR CARRYING OUT THE INVENTION

Figure 1:
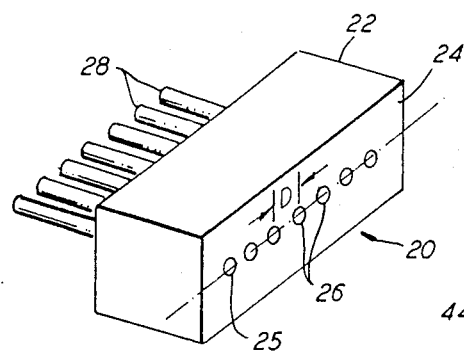
FIG. 1 shows an optical fiber array head comprised of precisely spaced apart fibers captured in a metal holder.

FIG. 1 shows a head or terminal fitting for a multiplicity of optical fibers, such as would be used in the position sensor described in the background. The head 20 is comprised of a metal holder 22 having a smooth face 24 on the plane of which are located the terminal ends 26 of a multiplicity of optical fibers 28. The lateral spacing D between the fibers is critical; to obtain high sensor resolution they ought to be positioned linearly from a baseline reference, such as first fiber 25, with an accuracy of about ±0.0025 mm. Typically, the 0.14 mm fibers have a center to center spacing of about 0.3 mm.

Figure 2:
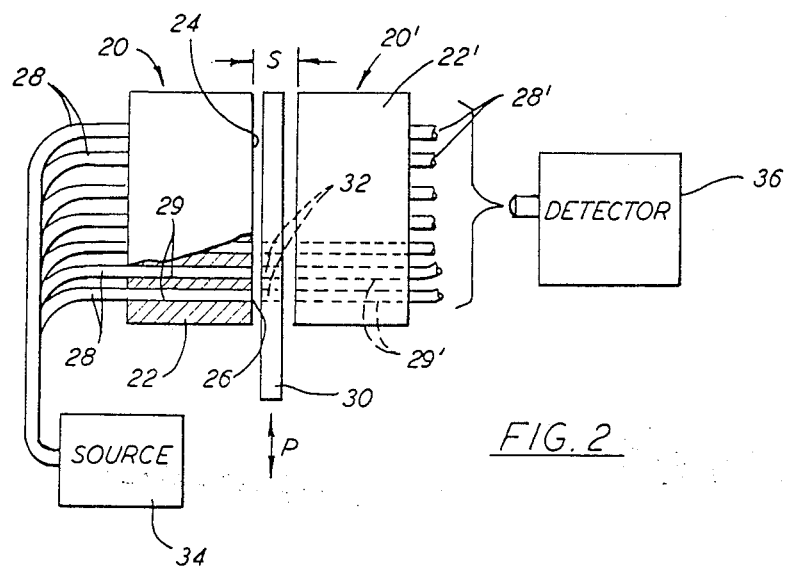
FIG. 2 shows an optical position sensor system which utilizes two of the devices shown in FIG. 1 together with an interposed movable modulator plate.

FIG. 2 is a planar view of a position sensor comprising two heads 20, 20' together with associated components. The fibers 28, 28' are captured in channels 29, 29' within the holders 22, 22'. There is a gap S between the two heads and within this gap is the movable modulator plate 30 which has spaced apart performations 32 correlated with the fiber optic spacings in the identical opposing heads 20, 20'. Movement of the plate 30 in the direction P causes light to be selectively transmitted at selected fiber optic links; the perforations in the modulator plate are encoded to provide meaningful information on the exact position of the plate 30. In use, light from a source 34 is conducted through fibers 28 to the transmitter head 20, is emitted from the polished ends 26 and across space S through a plate opening, and is received at the terminal ends of the fibers 28' in the receive head 20', then conveyed to the detector 36.

Figure 3:
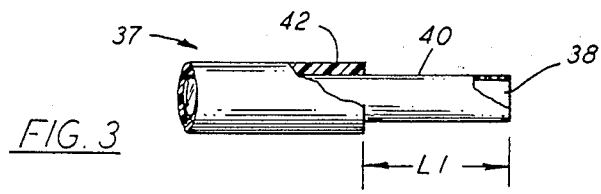
FIG. 3 shows in partial cross section a typical jacketed glass optical fiber from which a portion of the jacket has been removed.

FIG. 3 shows a typical optical fiber 37, such as a Corning Type 1505 (Corning Glass Works, Corning, N.Y.). This fiber has a quartz core 38 of 0.1 mm diameter surrounded by a glass cladding 40 of about 0.020 mm thick. The clad core is housed in a polymer jacket 42 consisting of a radiation cured acrylate polymer of about 0.12 mm thick. FIG. 3 shows the jacket 42 removed from a length L1 of the fiber to expose the core.

Figure 4:
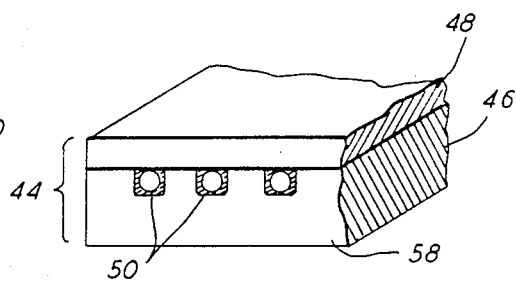
FIG. 4 shows a portion of a two piece holder in which optical fibers are secured by solidified liquid metal in a practice of the invention.
Figure 5:
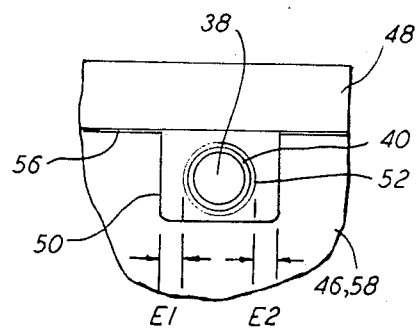
FIG. 5 is a more detailed view of a portion of the article shown in FIG. 4.

FIGS. 4 and 5 show how a head is made in accord with the invention. A holder 44 is comprised of a first base part 46 and a second cover part 48. Grooves 50 are placed in the surface of the first part 46. These grooves may be made by conventional machining, chemical milling, or other known means. The portion of the fiber which is to be included in the holder is stripped of its jacket by mechanical or chemical removal, to expose the clad core 38, 40 shown in FIG. 3. The clad surface is then metallized by a conventional technique, such as by radio frequency sputtering, vacuum evaporation, electroless plating or ion beam plating. For the aforementioned Type 1505 fiber, my tests have shown that electroless plating and vacuum evaporation are less preferred because they did not provide sufficient bond strength between the deposited metal and the quartz cladding 40. I prefer ion beam plating, especially when a portion of the jacket is to be metallized, as described below in connection with FIGS. 9 and 10. Preferably, the ion plating is nickel metal of about $1 \times 10^{-6}$ m thick.

The holder 44 is preferably made of steel, such as 17-4 PH stainless steel, or other metal which can be soldered. The holder may also be made from fused quartz or other non-metal, in which case the surfaces to be soldered must be metal vapor coated by known techniques, such as by radio frequency sputtering using a chromium-gold deposit, followed by an electroless nickel plate.

After application of the thin metal coating, the fibers are inserted into the channels, the assembly is heated and a low melting point liquid metal is infiltrated by capillary action into the channels. Various metals can be used for this purpose, such as those ordinarily used for joining metals. Preferably, 60 Sn/40 Pb solder, having a melting point of 183°–190° C., is utilized in the rosin core configuration familiar in the electronics field. As will be appreciated with the further disclosure herein, various other low temperature and high temperature solders may be used. However, it is important that the metal have a melting point less than the melting point of the thin metal coatings which are deposited on the fiber (or on the surfaces of a non-metallic holder). And of course, the soldering temperature must be less than that which degrades the fiber or holder.

FIG. 5 shows a detailed view of one of the grooves of the holder shown in FIG. 4 after the soldering operation has been completed. The core 38 with its cladding 40 and a thin metal coating 52 is completely surrounded by the solder 54 which fills the groove 50. The solder has wetted and is bonded to the metal coating 52 and to the surfaces of the holder portions 46 and 48. It is also seen in this embodiment that the solder 54 has flowed into the gap 56 between the holder parts to aid in holding them together. Of course, the two parts 46, 48 of the holder 44 may alternatively be held together as by bolting, welding or other fastening.

I have discovered that there are far superior results obtained when liquid metals, such as common solder, are used in substitution of epoxy resins. The spacing E shown in FIG. 5 between each optical fiber and the sides of its groove is equalized. In contrast, when using epoxy resins normal for the purpose, such as Epotek No. 353ND (Epoxy Technology Company, Billerica, Mass.), the fiber will tend to lie randomly with respect to its lateral position within the groove. That is, the value of E will not be equal on each side and will vary from groove to groove in a holder.

Figure 6:
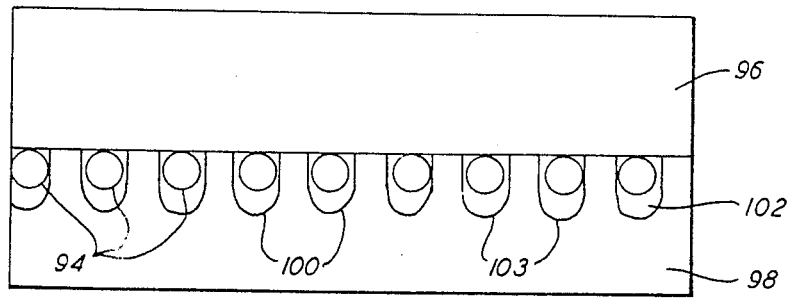
FIGS. 6 and 7 are drawings of 50X photo micrographs for epoxy and solder bonds respectively, showing the dif
Figure 7:
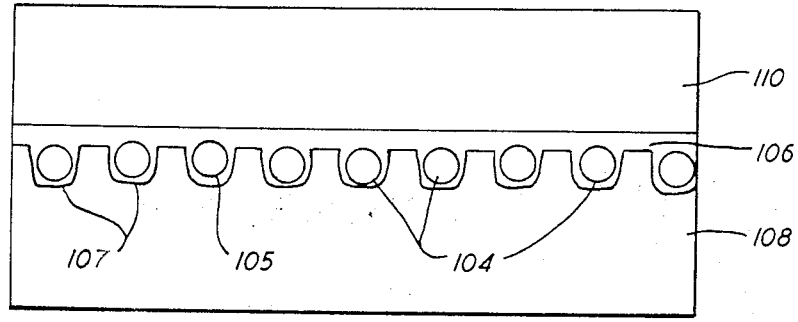

FIGS. 6 and 7 are line drawings of actual cross-sectional 50X photomicrographs which dramatically illustrate the difference between the old and new methods. FIG. 6 shows 0.140 mm dia fibers 94 encapsulated by epoxy 102 in a two part 96, 98 quartz housing having saw cut channels 100. It is seen that the location of the fiber varies to the left and right from channel to channel.

FIG. 7 shows fibers 104 which were captured by 60/40 solder 106 in a two piece 108, 110 quartz housing which had been radio frequency sputtered with a duplex layer of 0.1 nm Cr/0.2 nm Au and then flashed with 0.15 nm electroless nickel plate. The fibers had an ion plating of 0.001 mm copper. It is seen that the fibers are nearly identically centered in their channels 107. The cover 110 was not sufficiently weighted and thus is spaced apart from the base 108 by the continuous horizontal layer of solder. There is some variation in vertical elevation among the solder bonded fibers, but this is not critical to the use of a head in a position sensor. The lateral fiber spacing is critical and the center to center distance is held to a tolerance of less than about ±0.003 mm in the soldered holders.

In both examples, the grooves are about 0.165–0.190 mm wide, or about 0.025–0.050 mm wider than the fiber diameter. (The slight groove taper is a result of the sawing used to make the grooves.) Ideally the opposing fiber-to-channel wall spacings E1, E2 in FIG. 5 are equal. While in practice there will be some variation. In the invention the smaller dimension E1 will be greater than 10% of the larger dimension E2. This is in contrast to the epoxy-based prior art where E1 was often less than 10% of E2. Ultimately, with a very wide groove, it is probable the physical phenomena which produce the results cited will not be operative. Therefore, I believe the groove should be between 0.010–0.60 mm wider than the fiber diameter.

Of course, the groove spacing can be made exact within the tolerances of normal machining or photolithography processes. But from a practical standpoint, it is necessary that the groove be made slightly bigger in lateral dimension than the diameter of the metal coated fiber which it is adapted to receive. The reason for this is in part a practical dimensional question to account for variations in groove width and fiber diameter, and in part that it is a requirement for certain applications to have the fiber totally surrounded with the filler material, be it epoxy resin or metal as in the present invention. If the groove were slightly smaller than the optical fiber at any point (as might be the case if the groove were made extremely close to the optical fiber dimension) then there is a danger of damage to the cladding when the assembly is made.

The invention is advantageous in the foregoing in that completely surrounding the fiber with metal avoids any mechanical contact movement between the fiber and the holder, such as could result due to vibration or thermal transients.

There is a further advantage to the invention and this lies in the results which are obtained when the terminal ends 26 of the fibers are polished. This polishing is accomplished by polishing the entire face 58 of the holder in FIG. 4 (also shown as face 24 in FIG. 1) using $3 \times 10^{-6}$ m alumina abrasive on a cast iron plate, followed by fine optical cloth polishing. With the prior use of epoxy, there was some random occurrence of voids around the circumference of the fiber. Even in the absence of these, there was a tendency for slight chipping at the circumference of the polished fibers at the face 26. (This was especially observed in the making of the article in FIG. 8, below.) This chipping diminished the capacity of the optical fibers to transmit or receive light and adversely affected the performance of the position sensor. With the use of metal, such as lead solder, the chipping tendency was decreased and optical transmission improved.

The exact physics behind the surprising improvements which have been observed are not obvious. However, it is observable that the specific gravities of the metals (8–9) which I used are substantially greater than the specific gravity of the quartz fiber (2.6), whereas the epoxy resins tend to have lower specific gravities (1.1–1.3). Specifically, the specific gravity of 60/40 solder is about 8.4 and the specific gravity of the Epotek 353ND resin is 1.13. Thus, the metal would exert a bouyant force on the fiber whereas the epoxy resin would not. Another distinction is that the surface tensions of the liquid metal used are of the order of 900–500 dynes/cm whereas the epoxy resin surface tensions are believed to be substantially lower. Both bouyancy and surface tension aid the centering effect. Another difference is that metals I have used will as a class shrink substantially on solidification and cooling whereas epoxy resins as a class do not shrink substantially on curing. This will induce a tighter bond around the glass fiber and put it more in compression. Also, the tensile moduli of elasticity are higher than those of tin alloys ($4$–$5.3 \times 10^4$ MPa) and lead alloys ($1.4 \times 10^4$ MPa) are higher than those of epoxy resins ($0.05$–$0.45 \times 10^4$ MPa). These two aspects will minimize relative core movement and chipping during abrasion and polishing.

Figure 8:
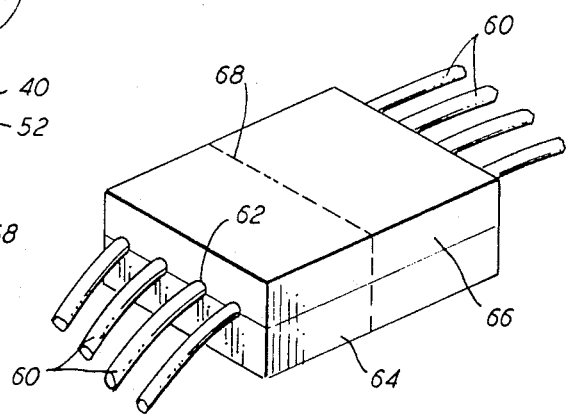
FIG. 8 illustrates an intermediate construction from which two holders having identical mating fiber arrays may be made, for use in the apparatus of FIG. 2.

FIG. 8 shows how mating transmit and receive heads can be easily made. Fibers 60 are stripped of their jackets for a portion of their central lengths and a thin metal coating is ion deposited on the exposed clad core. The fibers are laid in grooves 62 of a first part 64 of a holder. A cover 66 is placed on the first part, the assembly is raised to an elevated temperature and solder is infiltrated into the grooves, to capture the fibers and join the parts 64 and 66. After cooling the assembly is cut in two along the dashed line 68, transverse to the fiber lengths, as by using a 0.15 mm wide resinoid bonded diamond cutoff saw. Thereafter, the cut surfaces can be polished as previously described. Since the fibers are centralized within the grooves in the vicinity of the cut 68, the slight loss of material incurred due to sawing and polishing is not significant in upsetting the congruency between the opposing head surfaces. This would not be true to the same extent if the optical fibers followed a more meandering path within the grooves. Thus, it is possible now to make mating connectors which have exactly the desired fiber optic spacing.

The two piece holder is the most practical means of making the mating array as just described. But, when making a single unit at a time, alternate approaches are possible. Channels can be created by simply drilling holes through a metal holder. It is important in the invention that the solder wet the metal coating of the fiber, and the interior of the holder. In addition to the nickel coating which has been described, various other metals may be used, such as copper of $1$–$2 \times 10^{-6}$ m thick.

Other solders may be used in addition to the 60/40 solder, preferably those based on lead and tin. In addition, various gold based solders familiar in electronics work may be used, for instance gold-20% tin and gold-13% germanium, having melting point of 280° and 356° respectively. For higher temperature work solders based on silver, copper and nickel may be used.

As mentioned above, the polymer jacket is stripped from the glass center part when the fiber is bonded into the holder. The typical polymer coating on an optical fiber is not susceptible to a good bond with the epoxy resins which have been used heretofore. Therefore, a problem has thus been created, in that the flexing strain caused by movement of the optical fiber at the rear terminus of the holder will cause eventual breakage of the glass fiber. This can now be overcome in my invention.

Figure 9:
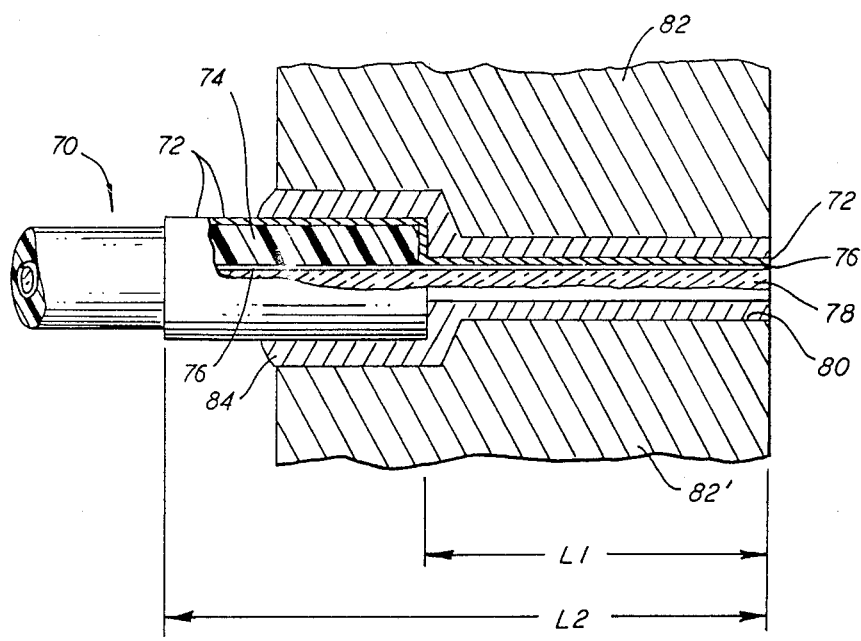
FIG. 9 is a cross section through a metal holder showing how both the jacket of a fiber and the clad fiber core may be secured to the holder by solder metal.

FIG. 9 shows the preferred manner in which this is accomplished. A polymer jacketed optical fiber 70 is stripped of its polymer jacket 74 for a length L1 as previously described. However, when the metal coating is next deposited, the metal coating 72 is caused to adhere to the jacket 74 as well as on the cladding 76 which surrounds the quartz core 78. Thus, the thin ion sputtered metal coating will extend back a distance L2 which is greater than the length L1. Then the coated fiber is inserted into a previously prepared channel 80 in a metal holder 82, 82'. Next the assembly is heated to an elevated temperature and liquid metal, such as 60/40 solder, is infiltrated. This centralizes the clad core 76, 78 within the smaller part of the channel, and forms as well a bond with the coating 72 which surrounds the polymer jacket and the holder. As a result, there is a fixed attachment of the fiber jacket to the holder 82 and any flexing of the fiber 70 external to the holder does not result in high stress on the fiber core. As will be evident, this aspect of the invention may be used in combination with the practice described in connection with FIG. 8.

Figure 10:
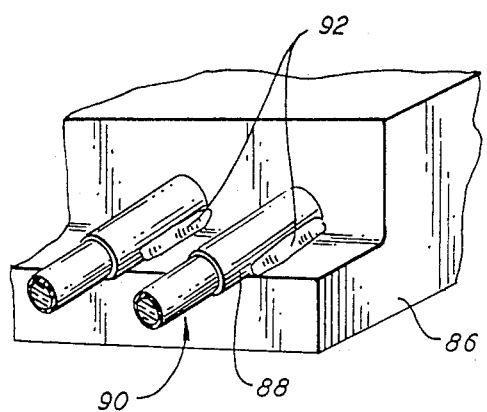
FIG. 10 illustrates an alternate manner for securing the jacket of a fiber to the holder.

FIG. 10 shows another embodiment of the invention wherein a holder 86 does not completely encapsulate the jacketed and metal vapor deposited portion 88 of a jacketed fiber 90. Instead, the solder 92 flows by capillary action to join the parts of the holder and metal coated jacket which are most proximite. Although the FIG. 10 embodiment provides less support to the fiber jacket, it tends to illustrate better the principles of the invention in that the fiber jacket is held tensilely to the holder and is not simply mechanically captured. Of course, the melting point of the solder which is used to attach a polymer jacket to the holder must have a melting point which is less than the temperature at which the polymer will degrade during the time of soldering and higher than the temperature at which the head will be used. For the acrylate polymer the degradation temperature is about 200° C. Therefore, the 60/40 solder is suitable, as will be other solders, including those known as Indalloy #2, #4 and #9 L (Indium Corporation, Utica, N.Y.).

While the article comprised of a holder and array of fibers has been referred to herein as a head, and the invention has been described in terms of the position sensor, the invention will be pertinent to all types of optical fiber connection or termination devices, including those having single or multiple fibers and those with optical fibers other than glass. The invention will be also useful for other devices than those adapted for transmitting light, where the devices require the centralized precision location of a small fiber.

Although this invention has been shown and described with respect to a preferred embodiment, it will be understood by those skilled in the art that various changes in form and detail thereof may be made without departing from the spirit and scope of the claimed invention.

I claim:

1. An optical fiber position sensor comprised of a planar-faced device for transmitting an optical signal and a mating planar-faced device for receiving the optical signal, each device having an identical array of a multiplicity of fibers, the devices positioned so that the planar face of each opposes the other across a gap;

each device comprised of a holder having a planar face and a plurality of metal surfaced interior channels; glass optical fibers coated with a first metal contained within said channels with their planar terminal ends spaced apart in a spacing pattern along the planar face of the holder; a cast and solidified second metal contained within the channels and completely surrounding the fibers, the second metal wetting and adhering to both the first metal and the metal surface of the holder; the terminal ends of the fibers precisely spaced apart within the spacing pattern to a tolerance of less than ±0.003 mm and relatively free from small circumferential cracks, compared to a like device made with a cast polymer instead of a cast second metal; and a movable modulator plate positioned within the gap and capable of intercepting an optical signal transmitted between the devices, the plate having perforations on a spacing pattern which correlates with the spacing pattern of the terminal ends of the fibers, the motion of the plate varying the opposing pairs of fibers in the arrays through which light can be transmitted.

2. The sensor of claim 1 wherein the second metal has a tensile elastic modulus of $1.3-5.3 \times 10^4$ MPa.

3. The sensor of claim 1 wherein each holder is comprised of two joined together parts, the first part having grooves, and the second part closing over the grooves to thereby form the channels, characterized in that each groove is between 0.010–0.060 mm wider than the fiber contained therein.

4. The sensor of claim 3 wherein each fiber is about 0.140 mm in diameter and wherein each groove is about 0.010–0.060 mm wider than the fiber diameter.

5. The sensor of claim 1 wherein each holder is made of a non-metal surfaced with a metal.

* * * * *